United States Patent
Miller

(10) Patent No.: US 10,396,911 B1
(45) Date of Patent: *Aug. 27, 2019

(54) NOISE ANALYSIS TO REVEAL JITTER AND CROSSTALK'S EFFECT ON SIGNAL INTEGRITY

(71) Applicant: Teledyne LeCroy, Inc., Thousand Oaks, CA (US)

(72) Inventor: Martin T. Miller, Mardhall, MI (US)

(73) Assignee: Teledyne LeCroy, Inc., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,366

(22) Filed: Nov. 27, 2017

Related U.S. Application Data

(63) Continuation of application No. 15/284,676, filed on Oct. 4, 2016, now Pat. No. 9,843,402, which is a
(Continued)

(51) Int. Cl.
| | |
|---|---|
| H04B 3/487 | (2015.01) |
| H04B 17/23 | (2015.01) |
| H04L 7/00 | (2006.01) |
| H04B 17/21 | (2015.01) |
| H04L 7/033 | (2006.01) |

(52) U.S. Cl.
CPC ............ *H04B 17/23* (2015.01); *H04B 3/487* (2015.01); *H04B 17/21* (2015.01); *H04L 7/0029* (2013.01); *H04L 7/0331* (2013.01)

(58) Field of Classification Search
None
See application file for complete search history.

(56) References Cited

U.S. PATENT DOCUMENTS

| | | | | | |
|---|---|---|---|---|---|
| 6,014,411 | A | * | 1/2000 | Wang | ............ H04L 1/0068 375/259 |
| 6,028,897 | A | * | 2/2000 | Wang | ............ H03M 13/2993 375/265 |

(Continued)

OTHER PUBLICATIONS

Hamed Sanogo, A Proposed Framework for Measuring, Identifying, and Eliminating Clock and Data Jitter on High-Speed Serial Communication Links, Maxim Integrated, Mar. 3, 2010, 18 pages.*

(Continued)

*Primary Examiner* — Tung S Lau
(74) *Attorney, Agent, or Firm* — Andrew Dommer

(57) ABSTRACT

A method and apparatus for generating a probability density function eye are provided. The method preferably includes the steps of acquiring an input waveform, performing a clock data recovery in accordance with the input waveform to determine one or more expected transition times and defining a plurality of unit intervals of the input waveform in accordance with the one or more expected transition times. One or more values of one or more data points may then be determined in accordance with the input waveform in accordance with the one or more expected transition times, and a category for each unit interval in accordance with its state and its position within the input waveform may also be determined. One or more histograms may then be generated for the determined one or more values for each category of unit intervals.

18 Claims, 13 Drawing Sheets

Related U.S. Application Data continuation of application No. 13/739,106, filed on Jan. 11, 2013, now Pat. No. 9,496,993.

(60) Provisional application No. 61/586,341, filed on Jan. 13, 2012, provisional application No. 61/586,348, filed on Jan. 13, 2012.

(56) References Cited

U.S. PATENT DOCUMENTS

| | | | |
|---|---|---|---|
| 6,044,116 A * | 3/2000 | Wang | H03M 13/2903 375/265 |
| 6,151,010 A | 11/2000 | Miller et al. | |
| 6,195,617 B1 | 2/2001 | Miller | |
| 6,311,138 B2 | 10/2001 | Miller | |
| 6,539,318 B2 | 3/2003 | Miller et al. | |
| 6,791,545 B2 | 9/2004 | Miller et al. | |
| 6,965,383 B2 | 11/2005 | Ritter et al. | |
| 7,310,392 B2 | 12/2007 | Miller | |
| 7,434,113 B2 | 10/2008 | Miller et al. | |
| 7,437,624 B2 | 10/2008 | Miller et al. | |
| 7,505,039 B2 | 3/2009 | Campiche et al. | |
| 7,516,030 B2 | 4/2009 | Miller | |
| 7,519,874 B2 | 4/2009 | Salant et al. | |
| 7,899,638 B2 | 3/2011 | Miller | |
| 8,660,811 B2 | 2/2014 | Miller | |
| 2005/0144205 A1 | 6/2005 | Okita et al. | |
| 2008/0077357 A1 * | 3/2008 | Yamaguchi | G01R 31/31709 702/181 |
| 2008/0189064 A1 * | 8/2008 | Yamaguchi | G01R 29/26 702/69 |
| 2009/0043537 A1 * | 2/2009 | Yamaguchi | G01R 29/26 702/181 |
| 2009/0182530 A1 * | 7/2009 | Yamaguchi | G01R 31/31709 702/181 |
| 2011/0305270 A1 * | 12/2011 | Stojanovic | H04L 25/03184 375/232 |

OTHER PUBLICATIONS

Agilent technologies, 1998, Measuring Extinction Ratio of Optical Transmitters Application Note 1550-8, 31 pages.*
Mircon Enginnering, fall 08-Spring 09, 82 pages.*
Anritsu, Understanding Eye Pattern Measurements, 2010, 20 pages.*
"Clock Jitter Analysis with femot-second resolution", *Agilent Technologies, Inc.*, (2008), 1-52.
Dmitriev-Zdorov, Vladimir et al., "The Jitter-Noise Duality and Anatomy of an Eye Diagram", *DesignCon2014*, Martin Miller, Teledyne LeCroy Chuck Ferry, Mentor Graphics,(2014),1-25.
"Primer XYZs of Oscilloscopes", *Tektronix Copyright 2000*, (2000),1-44.
XYZs of oscilloscopes primer, *Tektronix* (Feb. 10, 2011),1-60.

* cited by examiner

NOISE ANALYSIS TO REVEAL JITTER AND CROSSTALK'S EFFECT ON SIGNAL INTEGRITY

CROSS REFERENCE TO RELATED APPLICATIONS

The present application is a continuation of U.S. patent application Ser. No. 15/284,676, filed Oct. 4, 2016 by Miller, entitled NOISE ANALYSIS TO REVEAL JITTER AND CROSSTALK'S EFFECT ON SIGNAL INTEGRITY, now U.S. Pat. No. 9,843,402, which is a continuation of U.S. patent application Ser. No. 13/739,106, filed Jan. 11, 2013 by Miller, entitled NOISE ANALYSIS TO REVEAL JITTER AND CROSSTALK'S EFFECT ON SIGNAL INTEGRITY, now U.S. Pat. No. 9,496,993, which in turn claims the benefit of i) U.S. Provisional Patent Application 61/586,341, filed Jan. 13, 2012 titled "Noise Analysis to reveal Crosstalk's effect on overall "Signal Integrity"" to Miller; and ii) U.S. Provisional Patent Application 61/586,348, filed Jan. 13, 2012 titled "Noise Analysis to reveal Crosstalk's effect on overall "Signal Integrity"" to Miller, the contents of these applications being incorporated herein by reference.

FIELD OF THE INVENTION

The invention concerns the analysis of Signal Integrity in the field of digital data communication and digital electronics in general. Specifically within this field, the invention concerns jitter, noise and crosstalk analysis and is related to a method and apparatus for evaluating jitter (or timing uncertainty) and noise (voltage uncertainty) performance of a data channel or clock under observation.

BACKGROUND OF THE INVENTION

In present day, Signal Integrity analysis is concerned with jitter (timing uncertainties) and noise (voltage uncertainties) performance of data channel(s) or clock circuits. These two dimensions, in which the electronic data channel or clock manifests are equally important and excessive jitter or noise can lead to data channel malfunction. The two phenomena are actually intertwined as increased noise generally leads to increased jitter, and jitter can result in increased noise.

This kind of analysis and investigation is generally categorized as signal integrity (SI) analysis. In recent history, most of the SI focus has been on jitter analysis. Much work has been done to devise methods (prior art) to decompose jitter into component parts which permit a better understanding of the nature of this "uncertainty in timing" we call jitter. Some attention has been paid to similar decomposing the noise of the same circuits, but this area has so far been underexploited.

Furthermore as more and more serial data channels are packed into close proximity the issue of "crosstalk" or unwanted interference between circuits has become a recognized problem to be addressed. There are a number of ways that this unwanted interference can affect and impair the performance, depending on the physics of the interference. One such mechanism is electromagnetic coupling. That is the propagation of fields arising from the rapidly changing currents in printed circuit conductors. The principle manifestation of "crosstalk" of this kind is "noise" by nature. "Noise" may be defined as any undesired pollution of a transmitted signal due to electronic noise (as defined in the industry) intrinsic to a data channel's circuitry, but including any effects induced by neighboring active signals, whether they are other data channels, or simply other dynamic electronic signals (or voltage sources) in the vicinity of a data channel under observation. Some "crosstalk" from other signals is understood to be included in the "noise" which can degrade and impair a data channel, and as such is undesirable. In light of the interest in crosstalk, a closer look at noise analysis is a logical extension of SI analysis. "Noise" in general for a data channel will encompass both the intrinsic noise of the channel, as well as any perturbations induced by the aforementioned "crosstalk" from whatever other signals are in the vicinity. To further complicate matters, whatever measurement instrumentation is employed to "observe" the data channel and other neighboring signals has its own "noise" contributions, and this measurement noise is as important to consider as either the intrinsic or the "crosstalk" noise components. To thoroughly dissect and analyze noise and whatever crosstalk may be present, it is important to develop a methodology that provides the most clear characterization of which parts of the "noise" are dependent on the average signal shape, which parts are bounded, which parts are not, and to isolate all that is not systematically related to the signal itself, so that it may be analyzed in relation to candidate crosstalk signals, for the purpose of identifying the source of the crosstalk.

The fundamental nature of an oscilloscope measurement (or waveform recording instrument) is one that "samples" at some nominally uniform time intervals the voltage of a signal which is presented to it. The voltage is a varying function over time for any data channel of interest, but even lacking a data channel, any voltage source has variations over time which are random and which are commonly known as "noise". The sources of noise are rooted in the physics of whatever circuit is being observed. There are many references on this subject easily available in text books and on the Internet.

A tool commonly used in studying noise and jitter is called an "eye" diagram. Such diagrams have been in existence for many years and offer a 2 dimensional approximation of the "probability density" for the signals under analysis (2D eye diagrams). These 2D eye diagrams have a number of weaknesses which are seldom discussed. One problem is that they continue to change as more and more data contributes to the eye diagram, and there is no easy way to know when you have "enough" data. This evolution of an eye diagram is due to the simple nature of random noise. It is well known in statistics that the expected value of the peak-to-peak of a Gaussian or Gaussian-like distribution of an observed set of events depends on the number of events observed. As more and more events are observed, the width of the observed distribution broadens. For example, FIG. 1 shows an eye diagram with a nine thousand UI eye [1] as it would look after nine thousand unit interval (UI) have been accumulated. Furthermore, FIG. 2 shows an eye diagram with a five million UI eye [3] as it would look after five million UI have been accumulated. As expected the extents of the populated regions of the eye have grown as more UI are accumulated. As such, two eye diagrams from a different number of UI cannot be compared directly.

Often eye diagrams are used to perform a "mask" test, wherein a polygon or polygons are used to define regions of exclusion not to be touched by the points in the eye diagram. The problem of course, is how much data is needed for a valid mask test, because the probability of a mask violation depends on how many chances the signal under test is given to violate the mask. This is fundamentally a consequence of the eye diagram being non-convergent. There are regions of the 5 million UI eye that are impacted [4], whereas for the 9 thousand UI eye the same region is not impacted [2].

One approach to solve this problem is to try to estimate from the eye diagram a "contour plot" or a 2-dimensional representation. The contour plot is a well known concept. It is supposed to represent the absolute probability of the signal under observation to touch a given coordinate in the eye diagram coordinates. Methods for this kind of calculation exist today. For oscilloscopes these methods suffer from ambiguity in calculating probabilities from an already formed eye. In particular in the region of the contributions from rising edges and falling edges contributions to the eye diagram make it impossible to know if the trajectory of the signal under test that produced that point was earlier or later. Furthermore in an already formed eye diagram, the separation of vertical (noise) contributions from horizontal (jitter) is not possible. For example, if one wanted to compensate the eye diagram for the contribution of the measuring instrument's inherent noise, one cannot. Contour plots can also be generated by a Bit Error Rate Tester that is specially equipped for this task. This same shortcoming applies, in that the noise and jitter inherent in the instrument cannot be effectively removed from such a contour plot. It is notable that in the SI analysis prior-art there is a consortium based software tool referred to as "Stat-Eye". This tool can produce eye diagrams based on assumptions about noise and jitter and these objects have a different set of problems while addressing some of the defects in ordinary eye diagrams. These are essentially predictive tools dependent on electronic models and conscious assertions made by the user of the tool.

In general, in current SI analysis, there is no way to independently analyze the spectrum on time-domain of "only" the non-deterministic part of the noise, without the spectrum of the signal itself present in the spectrum.

The inventor of the present invention has determined that both contour plots and eye diagrams would be more useful for comparing test cases where crosstalk is present compared to cases where crosstalk is not present, if the above shortcomings could be overcome. The compensation is important to minimize the impact of the measuring instrument, and improving the quality and precision of the contour plot would be very beneficial.

Current SI methods do permit characterization of a data pattern's systematic trajectory, or shape through every bit or UI of the test pattern. This is accomplished via resampling data to have exactly N resampled points and forming a signal average from these resampled points. Such methods are standard in industry standards serial-attached-SCSI (SAS) for the purpose of estimating total waveform distortion penalty (TWDP). However these methods only supply the shape or trajectory of the signal under test, either as a function of position within a repeating sequence of test data, or as defined by the surrounding local sequence of data states.

Therefore, the inventor of the present invention has determined that what is needed is:
1. A convergent form of the eye diagram. That is one which does not change significantly as more data is accumulated.
2. A means to compensate the eye diagram for the noise inherent in the measuring instrument.
3. A means to overcome the inability of an oscilloscope to produce a contour plot which extends outside the central region of the eye.
4. A means to produce a contour plot which is compensated for the inherent noise of the measuring instrument.
5. Good methods for visualizing effects of crosstalk.

OBJECTS OF THE INVENTION

Among others, it is an object of this invention:
1. To provide a means to produce a convergent form of the eye diagram. That is one which doesn't change significantly as more data is accumulated.
2. To provide for an eye diagram that is compensated for noise inherent in the measuring instrument.
3. To overcome the inability of an oscilloscope to produce a contour plot which extends outside the central region of the eye.
4. To provide a contour plot that is compensated for the inherent noise of the measuring instrument.
5. To provide methods for visualizing effects of crosstalk.

Still other objects and advantages of the invention will in part be obvious and will in part be apparent from the specification and drawings.

SUMMARY OF THE INVENTION

One or more embodiments of the present invention may be provided to overcome the drawbacks of the prior art. To overcome the non-convergence problem, one or more embodiments of the invention preferably break down the analysis of signals under observation first into unit intervals of a clock or data sequence, and then categorize each unit interval as belonging to a category defined in such a way as to group together unit intervals that are very likely to have similar or even identical history, and so may be expected to have a well defined trajectory over the span of the unit interval. For each observed category, at several time intervals within and surrounding the UI (which need not be uniformly spaced) the distribution of vertical (usually voltage) values is preferably captured. The number and precise locations of these distributions is preferably chosen to adequately describe the changes in vertical variations for a category, so that the vertical distributions for the category can be estimated over the entire breadth of a UI as well as regions extending somewhat, into adjacent UIs. By treating the categories separately, the nature of the distributions are better constrained and they are much simpler to analyze and parametrize.

Once significant statistical distributions have been captured, and each distribution may be parameterized, and probability density maps may be made for each category. The superposition of all categories or a subset of categories (e.g. all categories with a transition at the start of the UI) can be superimposed to produce a convergent probability distribution function (PDF) map which is a superior eye diagram, the PDF-Eye. In addition since the parameterization of the distributions lends itself to adapting a Gaussian component of the distribution, it can be compensated for the measuring instrument's noise, overcoming the need for additional compensation.

Likewise a probability map (as distinguished from a probability density) may be created from the parameterized distributions from which a superior contour diagram, the cumulative distribution function (CDF)-Eye may be derived. In this way, in accordance with an embodiment of the invention, it is possible to create the probabilities of the signal under test to impact every coordinate on the eye diagram's space, even extending outside the central region of the eye. Again as for the new PDF-Eye the need to compensate for instrument noise is overcome.

Furthermore, using the same inventive strategy for categorization and average values rather than distributions, the creation of a systematic waveform, with sample points at the same times as the captured input waveform can be formed where the non-systematic (random) variations have been removed. Furthermore, in accordance with an alternative embodiment of the invention, the difference between the input waveform and the systematic waveform provides a residual waveform consisting of only the non-systematic part of the signal under observation.

These new kinds of eye diagrams presented in accordance with one or more embodiments of the present invention exist in several varieties as described in this application, and they with the residual and systematic waveforms provide significant means for observing jitter, noise and crosstalk.

In accordance with additional embodiments of the invention, it is further possible to build an apparatus to implement the acquisition, clock recovery, capture of distributions and a processor for processing them with a processor to produce these results and displays.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

For the purposes of this application, the procedures for acquiring digital waveforms, subtracting them if they are differential (i.e. much as the implicit electronic "receiver" would effectively subtract the differential analog counterparts), the detection of transitions for either clock or data, clock data recovery (CDR), digital resampling and are all understood as procedures well known in the prior state of the art. As such these methods do not require further detailed descriptions.

Figure 1:
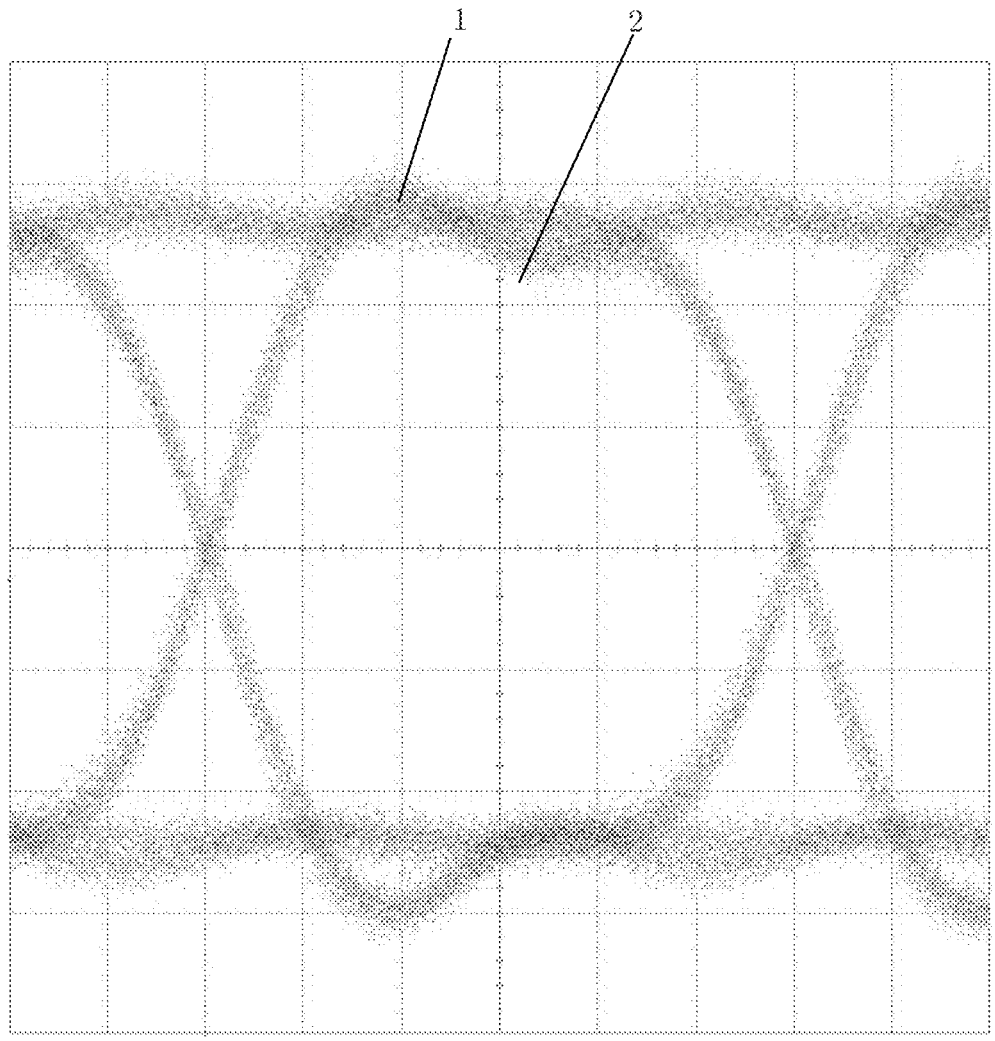
FIG. 1 is an eye diagram containing nine thousand UI according to prior art methods.
Figure 2:
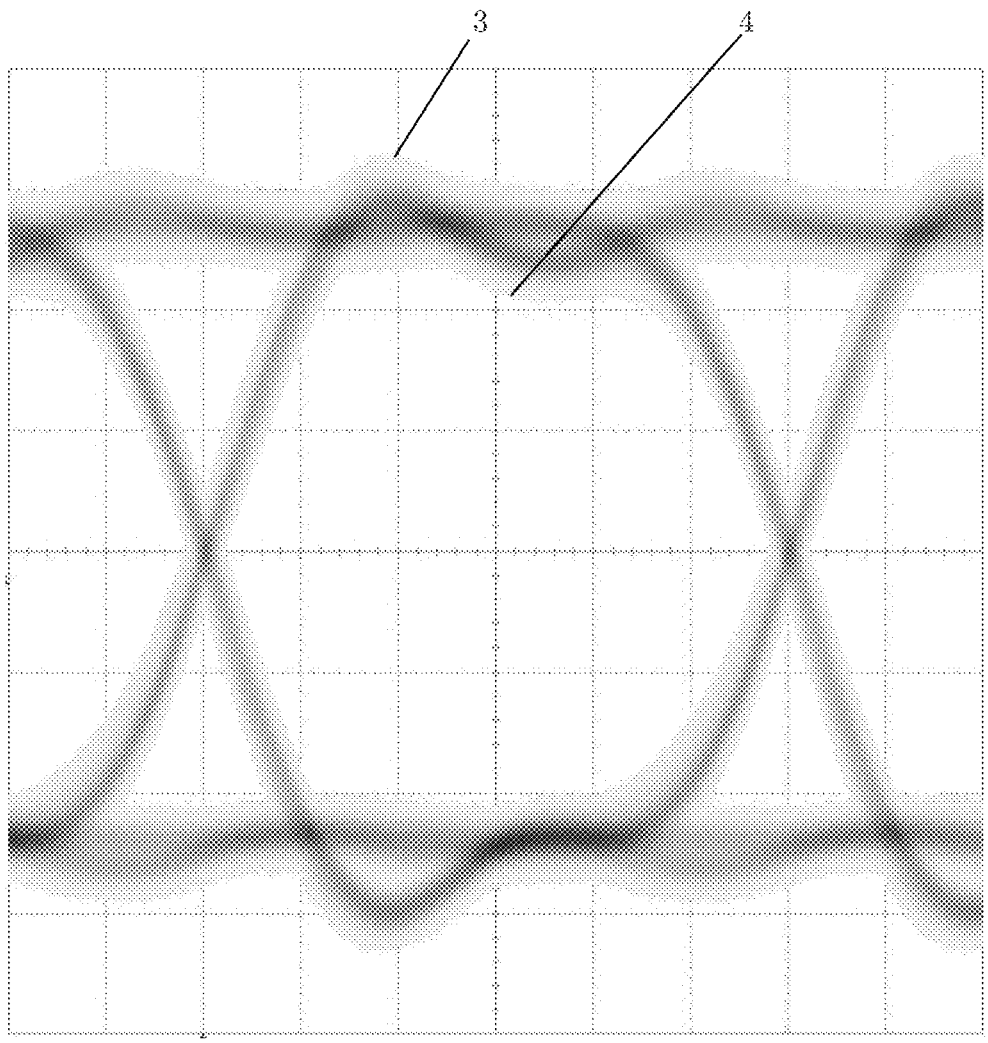
FIG. 2 is an eye diagram containing five million UI according to prior art methods.
Figure 3:
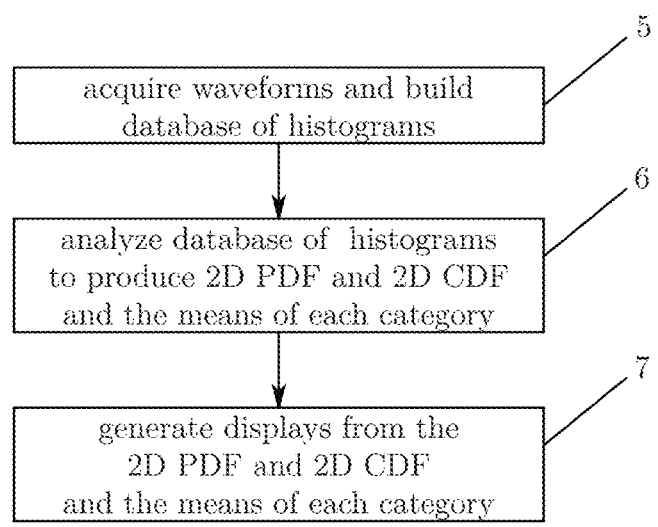
FIG. 3 is the flow diagram of the three major steps in accordance with an embodiment of the preferred embodiment.

The three basic steps of a particular embodiment of the preferred embodiments are shown in FIG. 3. Here we see a first step [5] consisting of the acquisition and analysis of waveforms to produce a database of histograms followed by a second step [6] consisting of the analysis of the database of histograms to produce a 2D PDF object [33], a 2D CDF object [34] and a set of mean values followed by a final step [7] consisting of the generation of displays from the 2D CDF object [34], 2D PDF object [33] and the set of mean values.

Figure 4:
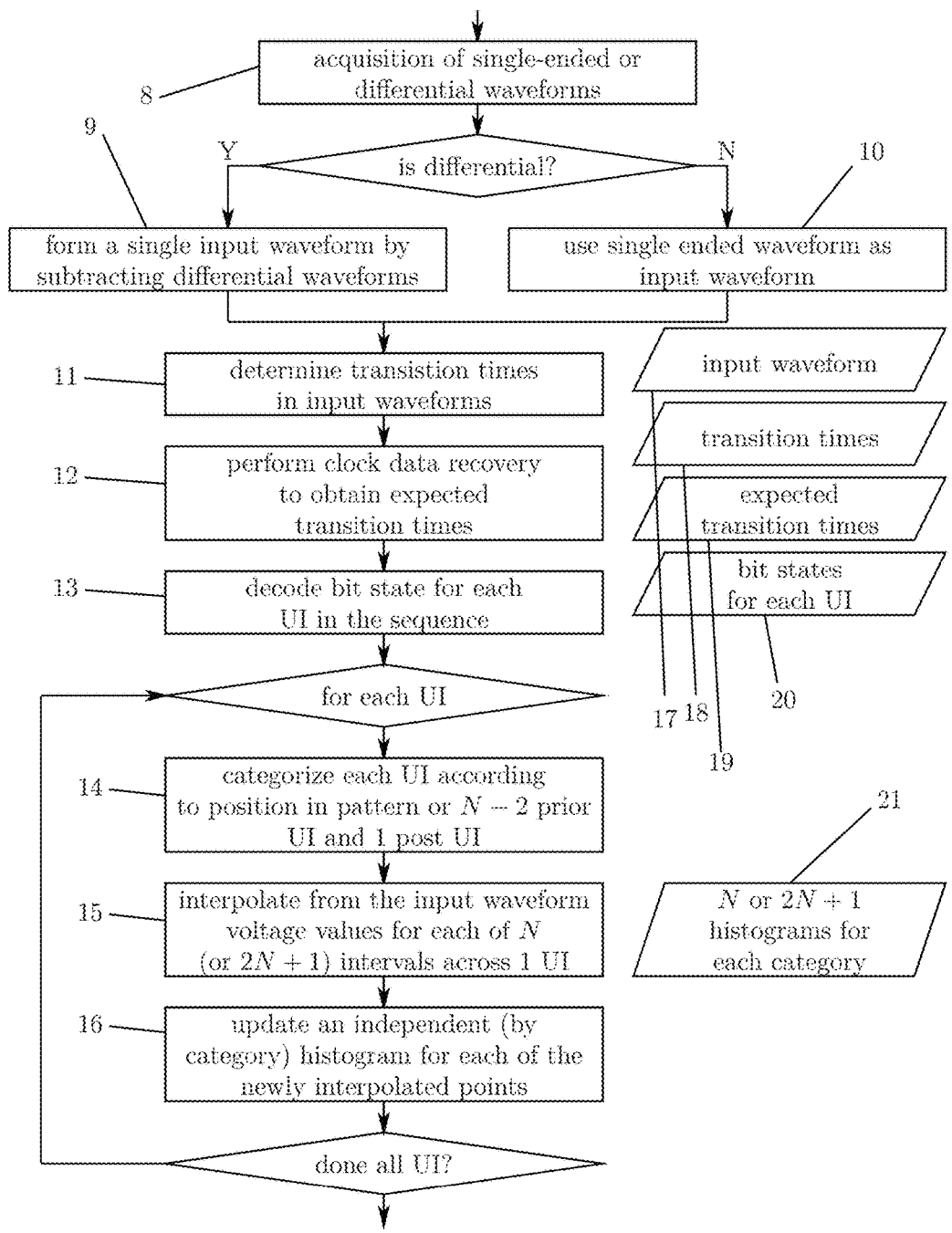
FIG. 4 is a flow diagram showing the steps of acquiring waveforms and building a database of histograms in accordance with an embodiment of the present invention.
Figure 5:
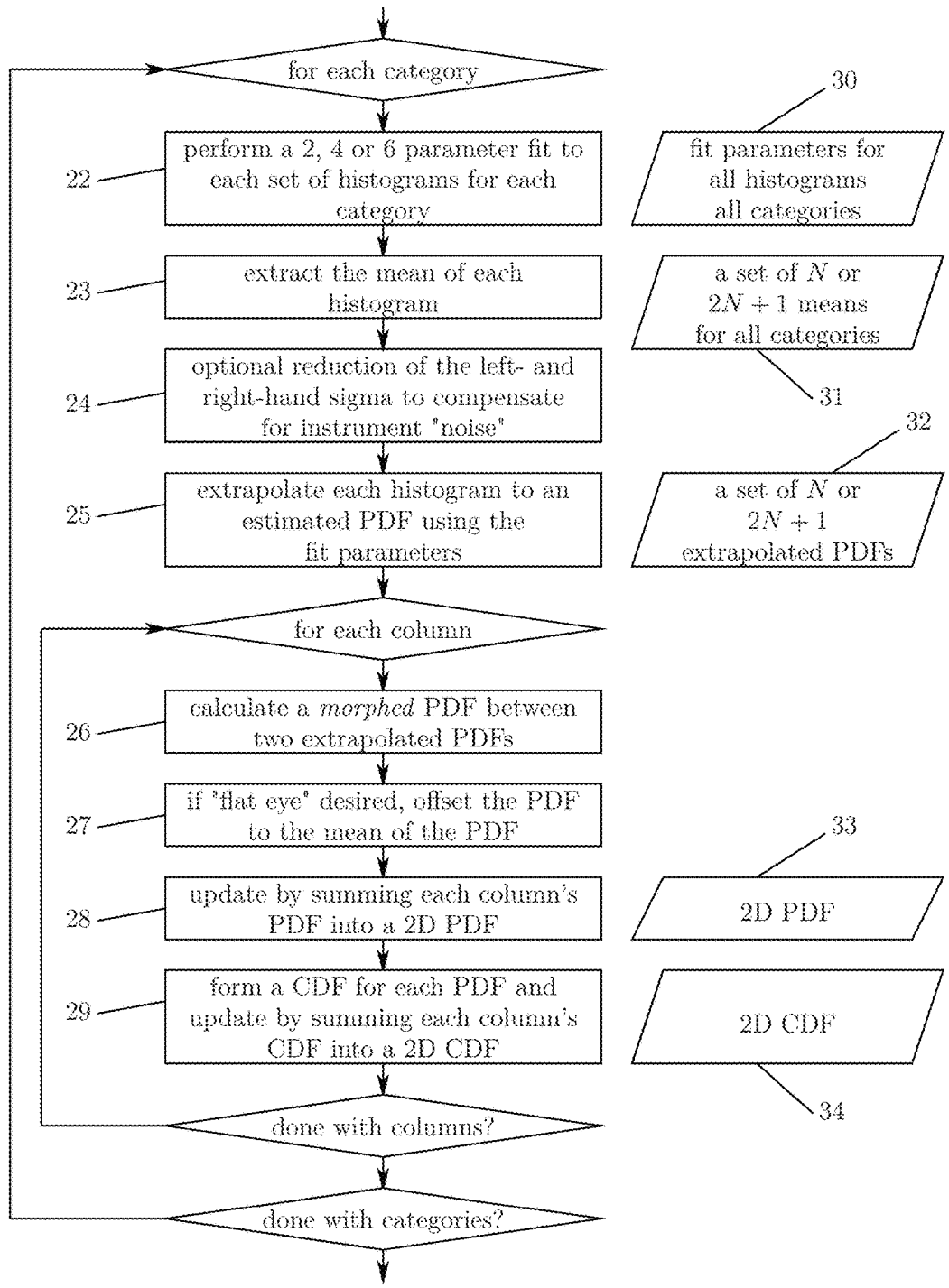
FIG. 5 is a flow diagram showing the steps of analysis of the histogram database in accordance with an embodiment of the invention.

Referring next to FIG. 4 in addition to FIG. 3, during this first step [5], first input waveforms may be acquired [8] and a single input waveform obtained [9] or [10]. Next, the input waveform is preferably analyzed to identify transition times [11]. A CDR procedure may then be performed [12] resulting in the recovered times defining the start and end of each UI in the captured input waveform. Once this is accomplished the next step is preferably to decode the states (1 or 0) for each UI in the waveform [13] producing a list of sequential bit states for the waveform. Two cases must be addressed, the case where there is a repeating pattern in the sequence of states and the case where there is no such repeating pattern. Depending on which case, a categorization method [14] will preferably be either: 1) the category associated with each UI is defined by its position in the repeating pattern, or 2) if there is no repeating pattern, the category for a UI will be defined by an M-bit binary code consisting of the M−2 bits (or other number of bits) prior to the UI, the state of the UI and the state of the following UI (or other predetermined number or portions of UIs).

One purpose of analysis in accordance with the various embodiments of the invention is to uncover any non-systematic behavior, and then to isolate the systematic from the non-systematic. An essential element of these various elements of the invention is to determine the "average" shape of the serial data or to establish the systematic behavior.

Figure 6:
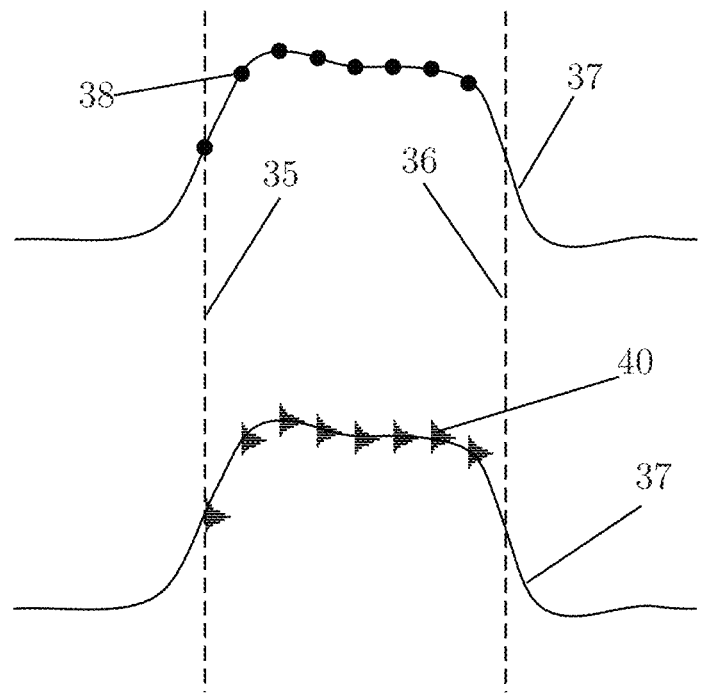
FIG. 6 shows samples and noise histograms across one unit interval in accordance with an embodiment of the invention.
Figure 7:
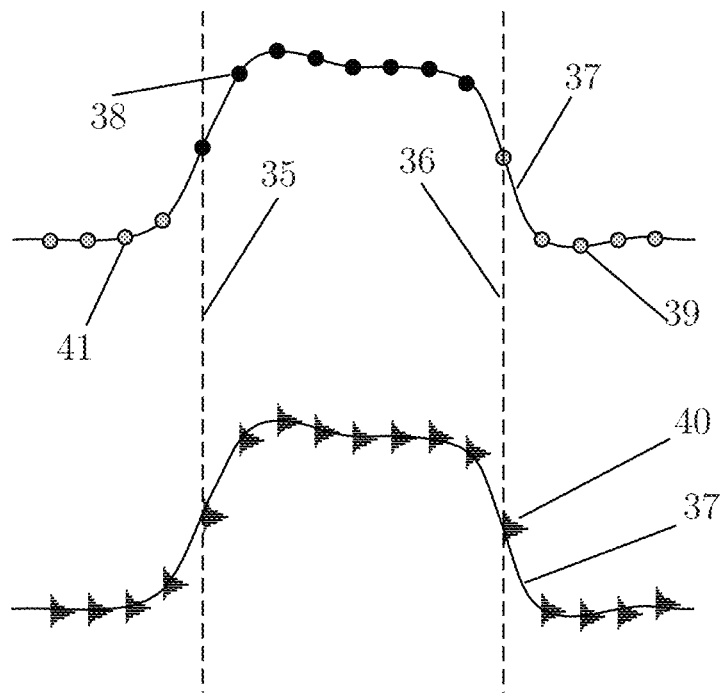
FIG. 7 shows samples and noise histograms across one unit interval in accordance with an embodiment of the invention.

It is well known for the purposes of establishing the shape of the trajectory for both the repeating pattern case and the non-repeating pattern case. For the case of a repeating pattern FIG. 6, for N horizontal intervals across a UI from the start of the UI [35] to the end of the UI [36], only N points [38] are needed, since the points from the previous and next UIs will provide the necessary points before and after the UI in order to reproduce the trajectory of the category over the horizontal extent of the eye. For the non-repeating case FIG. 7, more points are typically needed to establish the average trajectory over the same horizontal extent as the traditional eye. In the preferred embodiment 2N+1 resampled data points are used (although other choices are possible). An additional N/2 points before [41] the UI, N points inside[38] the UI and N/2+1 points after [42] the UI are preferably employed. In this preferred embodiment of the invention, instead of forming a simple average at each of the resampled points, a histogram may be formed[40] for each of the sample points in each category from which an average can later be obtained, but from which much additional information can be gained about the nature of the vertical noise.

Therefore, further in accordance with one or more preferred embodiments of the invention, in order to perform the step of analyzing substantially every UI in the input waveform as described above, N or 2N+1 data points are interpolated from the input waveform [15] and the N or 2N+1 histograms for the category of this UI is updated [16]. A database [21] is formed, including the data point interpolated values, which is organized by the observed categories, and which consist of either N histograms per category, or of 2N+1 histograms per category depending on whether there is or is not a repeating pattern (one for each data point included in the processing, as noted above). Multiple acquisitions may be treated in the fashion described above to accumulate good statistics and for the non-repeating pattern case to allow for rare categories to manifest. Once an adequate amount of data points have been acquired and interpolated, and therefore sufficient data is available to provide meaningful statistics, the generated database of histograms can be analyzed.

One objective of the next major step [6] is to analyze the database of histograms to produce a 2D PDF object [33] and 2D CDF object [34] which comprise inventive, novel forms of eye diagrams and contour plots. These will have the same vertical and horizontal extents as would a traditional eye diagram, and so an estimate of the PDF for each coordinate of that area may be made. Likewise an estimate of the CDF or probability of the signal under observation might pass through any particular selected coordinate may also be made.

Figure 8:
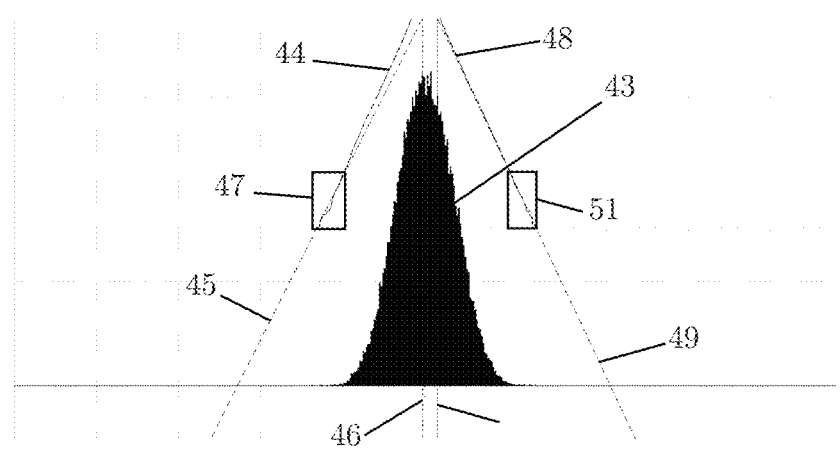
FIG. 8 is a noise histogram according to prior art methods.

There will therefore be generated a set of histograms for each category [21] Each histogram is fitted, which is by now a well known procedure as shown in FIG. 8, yielding 6 parameters: $\sigma_L, \mu_L, \rho_L, \sigma_R, \mu_R, \rho_R$. The CDF of the histogram is preferably translated to a vertical Q-scale [44] according to the optimized value of $\rho_L$ for which the data in the fit region [47] s most linear. The best fit line [45] ha s a slope which is the reciprocal of $\sigma_L$, and the intercept [46] at Q=0 of that line yields the value of $\mu_L$. An identical procedure may be performed on the right-hand side of the histogram to obtain $\rho_L$ from optimal linearization of the region [51], to obtain $\sigma_R$ from the slope of the line [49] and to obtain $\mu_R$ from the intercept [48].

For producing the average trajectory per category, the means of all histograms per category are preferably calculated [23].

Optionally, each set of fit parameters may be modified [24] to use a somewhat smaller $\sigma_L$ and $\sigma_R$ reducing them by a quadrature subtraction ($\sigma'_L = \sqrt{\sigma_L^2 - \sigma_{instrument}^2}$) of a known random noise, $\sigma_{instrument}$ contributed by the measuring instrument.

Using these 6 parameters, each histogram can be extrapolated to a PDF [25](i.e. including one variable, in addition to the extension along the time axis) using the parameters to express the low probability density values at the extremes, and simply interpolating the interior of the histogram to produce a PDF on a scale that matches the vertical extent and granularity of the eye type diagrams to be produced.

The method of "morphing" is well known. A form of morphing is preferably used to transform one fitted histogram to another is applied in order to fill in the space between the N histograms in order to construct a complete picture over the entire horizontal extent of the eye diagram. Of course, other forms of combination of the various resulting histograms may be employed. Once the set of PDFs [32] is calculated, to produce a column for every horizontal coordinate (for every column) of the desired PDF eye object [33] a "morphing" procedure is used [26]. If a flat-eye is desired, the PDFs may then be offset to have zero mean [27]. Next for each category, each column's PDF is summed [28] into a pre-initialized 2D PDF object [33] which is nothing more complicated than a two-dimensional array. Next for each column, the PDF may be integrated or summed to form a CDF.

In accordance with one or more preferred embodiments of the invention, there may be two ways to perform this summing depending on whether the desired final objects are to be "data centric" or "signal centric". The Data Centric method sums in such a way as to calculate the probability that the variations from the trajectory encroach or impact the center of the eye region (where data values are sampled in a real receiver). So in this case the probability of encroachment and therefore impact on the central region of the eye is highlighted, while little interest in the variations away from the center of the eye are considered. The signal centric method calculates the probability of variations away from the mean trajectory. It is interesting that both methods produce the same probabilities in the 2D CDF for the central region. But the signal centric version of the 2D CDF is one that contains information outside the central region of the eye. Both are interesting and may be used and employed in accordance with the various embodiments of the present invention.

Each of these sums is then summed (according to it's frequency of occurrence for the non-repeating case) into the 2D CDF object [34], completing the creation of all three objects of the second step [6] of FIG. 3.

Because each category of UI is analyzed independently, any ambiguity of whether contributions to the 2D CDF are from rising or falling edges is completely avoided. Furthermore both the 2D PDF and the 2D CDF are or can be compensated for the measuring instruments inherent noise.

As more waveforms are added to the procedure, a more precise a fit results, more accurately reflecting the underlying statistics of the observed noise. Consequently the estimate of the shape of each one dimensional PDF is convergent, which means the resulting 2D PDF object [33] and 2D CDF object [34] are also both convergent.

Figure 9:
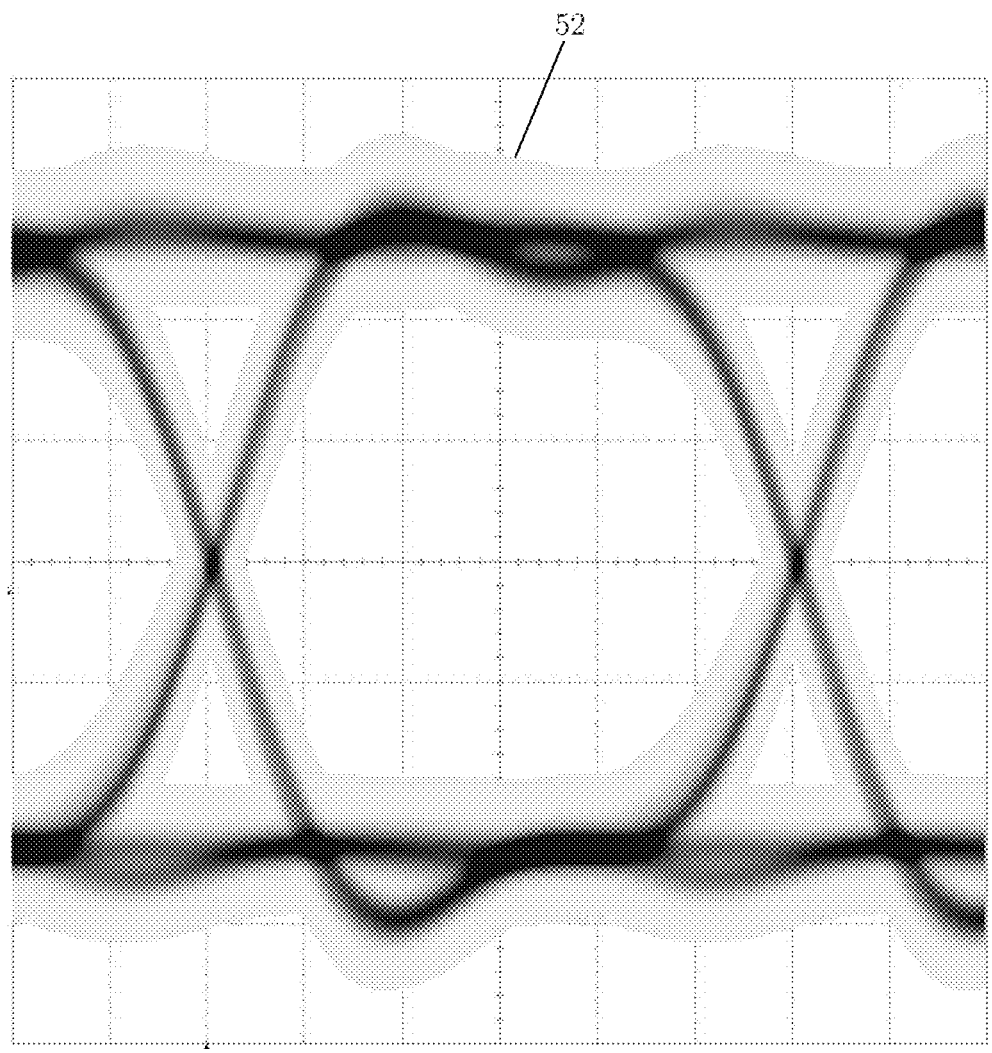
FIG. 9 is a PDF eye diagram according to an embodiment of the present method.

Next the third step [7] in FIG. 3, is to create displays from the objects created in the previous step. To preface these remaining steps, creating "eye-like" views is possible once the 2D PDF and the 2D CDF are calculated. The first such display is the PDF-eye [52] shown in FIG. 9. This PDF-eye [52] is preferably calculated from the 2D PDF and using known display techniques while stopping the translation to color at some minimum probability density (e.g. 1.0e-30 for this particular exemplary case). This PDF-eye [52] is convergent and would appear virtually unchanged for one hundred million UI as it would for one million UI.

Figure 10:
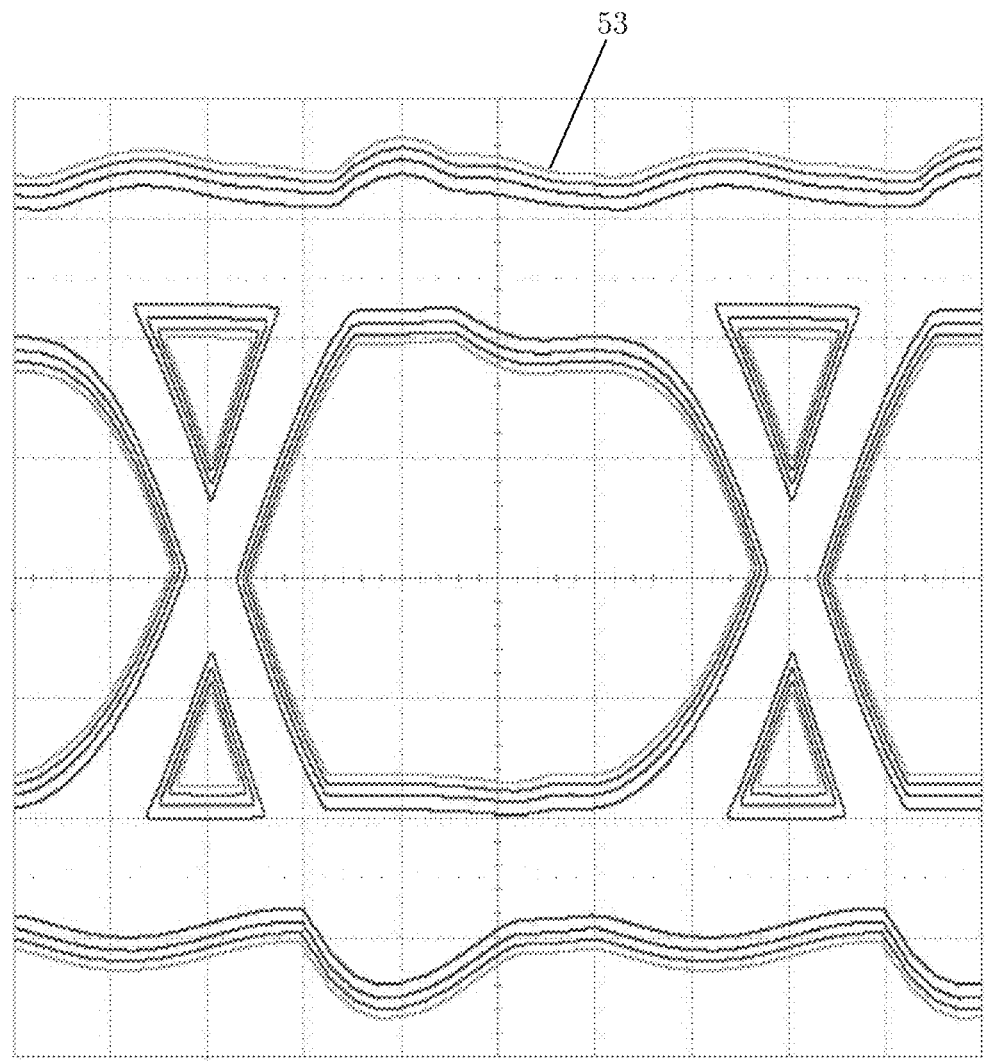
FIG. 10 is a contour plot containing lines of constant probability according to an embodiment of the present method.
Figure 11:
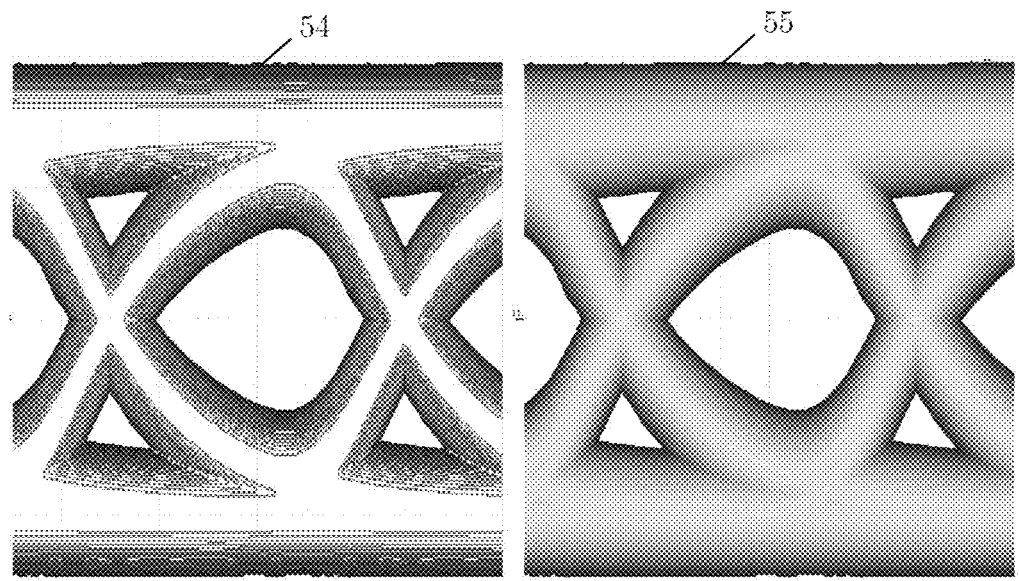
FIG. 11 is a pair of plots containing a signal centric iso-BER plot and a signal centric contour plot in accordance with an embodiment of the invention.
Figure 12:
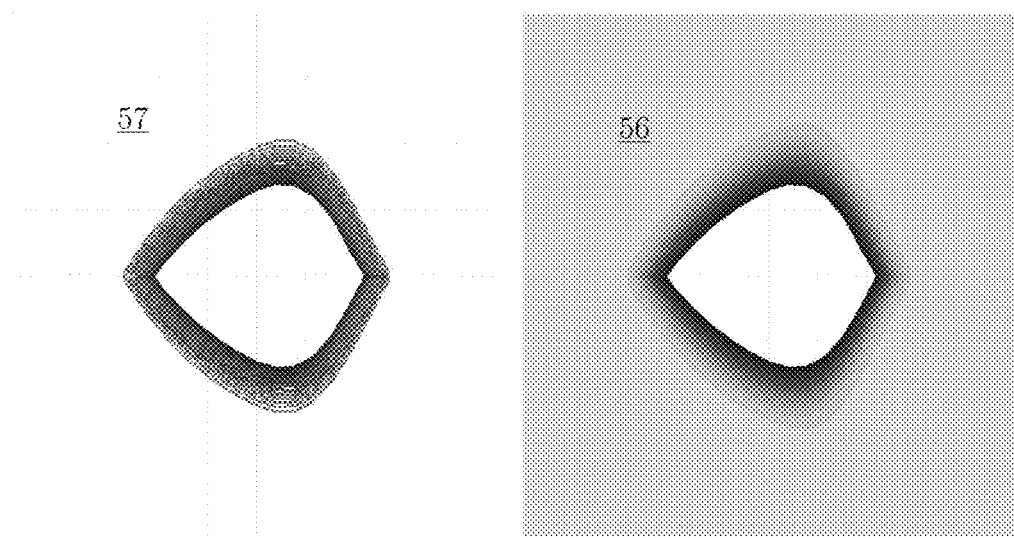
FIG. 12 is a pair of plots containing a data centric iso-BER plot and a data centric contour plot in accordance with an embodiment of the invention.
Figure 13:
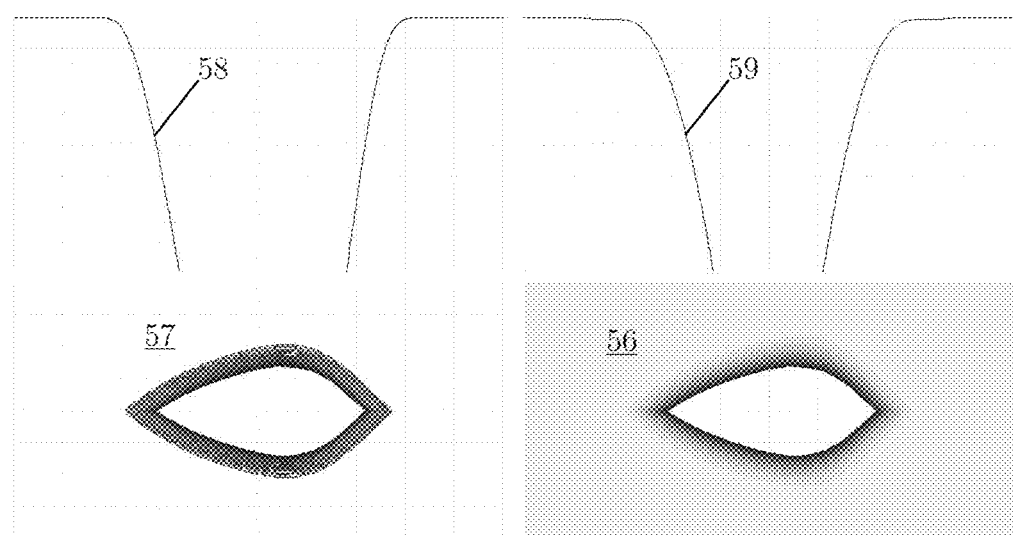
FIG. 13 is four plots containing a data centric iso-BER plot and a data centric contour plot along with a jitter bathtub curve and noise bathtub curve in accordance with an embodiment of the invention.

From the 2D CDF object [34] there are a number of different displays that may be provided. A contour plot may be made of the "signal centric" type as shown in FIG. 10. In this plot each line corresponds to a line of constant probability of the signal deviating from it's normal trajectory. The probabilities for 1.0e-6, 1.0 e-7, . . . 1.0e-15 are shown [53] for this particular exemplary embodiment of the invention. A method for generating such a plot, including determining the locations of the lines of constant probability, first an image of the 2D CDF object [34] is made [55] as shown in FIG. 11. The mostly continuous probabilities are then "terraced", whereby for a range of the variable K, each probability that is greater than or equal to $10^{-K}$ but less than $10^{-(K+1)}$ is reset to the value $10^{-K}$. Then each "pixel" in the displayed image which has a smaller value adjoining it becomes a line of constant probability. For the image [54] displayed in a particular exemplary embodiment of the invention, the range of K is 6 to 21 in steps of 1. Sometimes there may be too many lines too close together, so the steps can be increased as for [53] which shows the lines of constant probability for 1e-6, 1e-9, 1e-12 and 1e-15 (i.e. K=6, 9, 12 and 15). The most common contour plots in prior-art are displayed as data centric contours. That is they reflect the absolute probabilities that the signal under observation approaches the nominal sampling point of a digital receiver near the center of the eye. In FIG. 12 both the contour[56] and the display of lines of constant probability [57] are shown. These probabilities are closely related to the bit error ratio (BER) and so, often the [57] is called the IsoBER plot. A significant by-product of having these data centric contour plots, as is shown in FIG. 13, is obtained by producing a vertical slice noise bathtub curve [59] and horizontal slice jitter bathtub curve [58] across the data centric contour plot [56]. The jitter bathtub curve [58] is typically obtained from an analysis of jitter, yet apart from performing CDR to establish the start and end of each UI, no direct jitter analysis is traditionally performed. Using well known methods, in accordance with the various embodiments of the present invention, the provided inventive data sets can each be analyzed to obtain jitter decomposition for yielding total jitter (Tj), random jitter (Rj), deterministic jitter (Dj) and total noise (Tn), random noise (Rn), deterministic noise (Dn).

Figure 14:
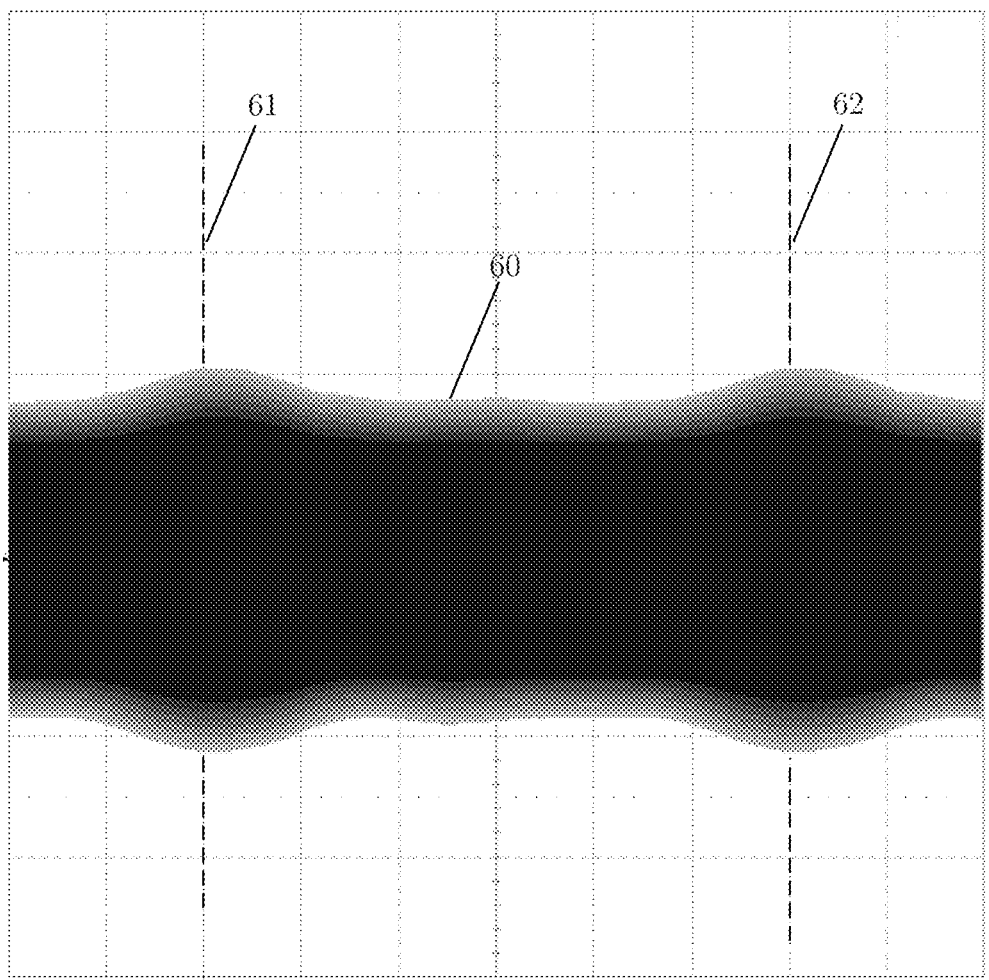
FIG. 14 is a flat CDF eye diagram in accordance with an embodiment of the invention.

Another display flat. CDF eye [60] shown in FIG. 14, provided in accordance with yet another embodiment of the invention, is considered to be quite unusual by the inventors of the present invention, and is therefore considered to be quite useful and novel. Like all other eye diagrams this image represents behavior of the signal under observation over a region spanning somewhat more than one UI. For illustrative purposes the flat start of UI [61] and flat end of UI [62] are shown. As described in the procedure above, the 1-dimensional PDF's have been offset to have zero vertical mean. The consequence of this seemingly arbitrary choice, is to remove the trajectories for each category contributing to the 2D PDF object [33] and 2D CDF object [34]. By removing the means, or the mean trajectory, the remaining information shows only noise. This is extremely important for at least two reasons: 1) the bulges at flat start of UI [61] and flat end of UI [62] indicate a contribution to the measured noise that is caused by jitter and 2) any systematic crosstalk, as might be expected for a nearby data channel will manifest as a systematic bulge in this display-type. So this novel display type is useful to identify both jitter and crosstalk.

Figure 15:
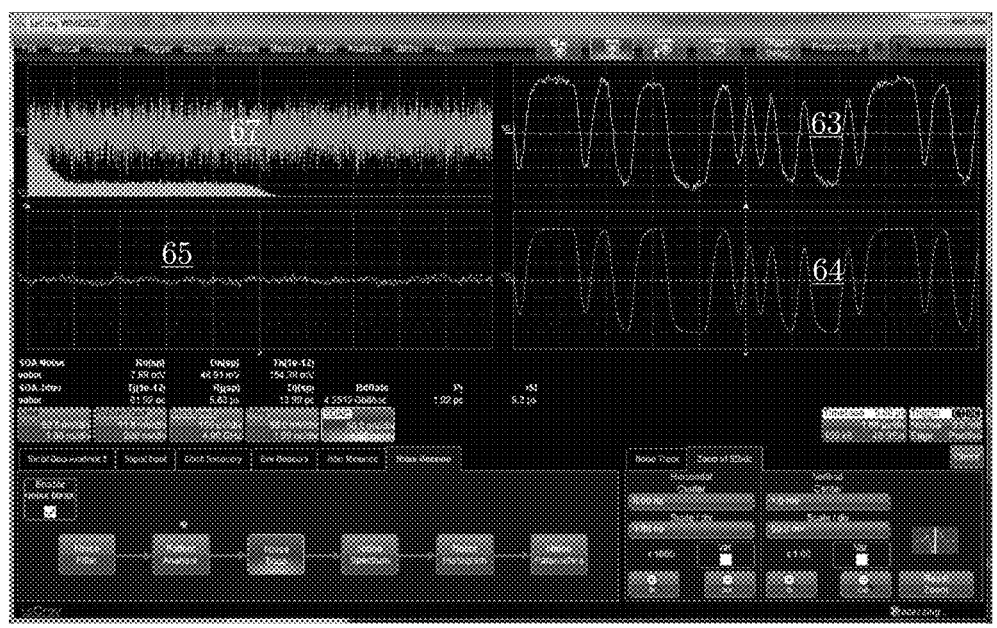
FIG. 15 is a plot showing the systematic waveform and residual waveform according to an embodiment of the present method.

Another line of analysis is shown in FIG. 15 and leverages the database of means by category [31] as well as the expected transition times [19] and [20] for the most recent [17] (and any number of subsequent acquisitions). For each data point of each input waveform [63] UI in the input waveform [63], the [20] may first be used to obtain a category. The database of means by category [31] for that category may then be further employed in conjunction with the expected transition times [19] to define the start and end of the UI. As a result, a new data point may be calculated for every data point in the input waveform [63] (with the exception of some points at the beginning and some at the end of the waveform lacking adequate surrounding points to identify a category) by interpolating from the database of means by category [31] for the category points at the same horizontal (time) coordinate. In this way, a new systematic waveform [64] is preferably created from which noise and jitter have been substantially removed. Subtracting this systematic waveform [64] from the input waveform [63] produces a residual waveform [65] which consists of only the non-systematic part of the waveform under analysis. This waveform can be analyzed to obtain spectrum of the residual waveform [66] of only the non-systematic part of the input waveform, which is a critical.

In accordance with a first preferred embodiment of the invention, first, a digital data stream is recorded by a digital measuring instrument, such as a digital oscilloscope, and stored as a digital waveform. Second, the recorded waveform may or may not be "equalized" using any combination of the methods "Continuous Time Linear Equalization" (CTLE), "Feed Forward Equalization" (FFE) and/or "Decision Feedback Equalization" (DFE) or similar equalization methods in order to better define the states of the signal and the transitions of the signal.

Next, as in part explained by U.S. Pat. Nos. 7,310,392; 7,434,113; 7,516,030; and 7,519,874; the entire contents of each of these patents being incorporated herein by reference, the times of the threshold crossings of the serial data marking the transitions from "zero to one" and "one to zero" may be recorded.

Next, using these times, a sequence of bit-states is determined according to the assumption that a one state immediately follows a positive transition, and the bit state remains one until there is a negative transition. Likewise, a zero state follows a negative transition and remains a zero state until there is a positive transition. Using knowledge of the nominal bit-rate combined with clock data recovery two essential pieces of information may be associated with every bit interval in the serial data sequence: 1) the state of each bit, and 2) the "expected" (An analytic clock data recovery analysis procedure establishes the "expected" time of the bit transition, by essentially determining an average of the detected edge times) transition time (as per an analytic clock data recovery procedure).

Next, using the "expected times" to define a local "unit interval" (UI) beginning at the expected transition time and ending one nominal bit interval later, the UI is preferably divided into an integer number of equal sub-intervals (e.g. 16 equal intervals across the UI). Note that in an alternative embodiment, the intervals need not be equal or uniform, but may be chosen to be smaller in the region of the start and end of the UI, in order to assure adequate sampling and bandwidth fidelity for these portions of the UI that shall contain higher-frequency components of the signal under observation. It is however, sufficient to simply increase the number of sub-intervals, should it be the case that the chosen number is too small to assure an adequate Nyquist limit for the implied sampling (e.g. conditions may require a larger number of sub-intervals, like 64 sub-intervals of 1/64 of a UI). Using non-uniform intervals would be an optimization intended to reduce computing resources, and is an option, but only inasmuch as it may extend the utility of this method for a limited amount of computing resources (i.e. memory and time).

Next, according to a newly defined local UI, the same number of precise sampling times is may be established as the least-time boundaries of each of the subintervals. For N subintervals, those times would be: 0.0 UI, 1/N UI, 2/N UI ... (N−1)/N UI. Using these precise sampling times, and using the (prior-art) numerical interpolation (Numerical interpolation has many variations, but in its most basic form consists of a sin(x)/x, windowed resampling algorithm), one value may be "interpolated" from the recorded waveform (the version existing prior to any equalization procedures, if that is the desired signal to analyze) at each of the precise sampling times.

Next, for either one of two possible "categorizations" of local bit sequence history: 1) a specific position in a repeating binary numeric sequence, or 2) a specific local history of numeric bit states (specifically some number of prior bit states, the current bit state, and some following bit state) of M total bit states (M−2 prior states, 1 state, and 1 following state). Either of these categorizations may be determined. For the second type of categorization, a similar selection of N intervals within the UI is made, however for each category, some additional intervals extending into the prior and post UI's are required, since the categories are not "contiguous" and the additional information is required to produce the subsequent steps in this procedure.

Furthermore, according to and uniquely associated with the categorization which has been determined, each of the newly sampled voltage values (associated with each of the precise sampling times) may be introduced (accumulated) to a histogramming procedure that records the number of times each voltage value occurs over small intervals of voltage, adequately small to accommodate a statistical distribution approximating the likelihood of voltage variations to occur. Much algorithmic "cleverness" can be applied to this procedure, such that a minimum of computing resources are required to obtain the distribution of observed voltage variations can be adequately recorded, however in the most brute-force implementation, the "small intervals", or bin width of the recorded histograms can be made as resolute as the recording instrument with no loss of information. Each of the N histograms is preferably accumulated and recorded only for the category for which this UI is associated.

In summary at this point, N histograms are associated with each category, and are accumulated for all observed categories. These histograms have been accumulated using points interpolated from the recorded input signal at precise intervals over each UI, defined by the expected transition times derived from a CDR procedure. Each of these distributions represents a statistical sampling of signal plus "noise", categorized as defined above. As more and more waveforms are recorded, this set of histograms (which may be considered a "database" of distributions associated with categories of local bit sequence) can be augmented with more observations of the signal plus noise, independently of the subsequent steps, whose purpose is to interpret the noise distributions. As such these first steps may be repeated for many observations, each time improving the statistical significant for the signal plus noise distributions.

After having performed as much accumulation as is possible or desirable, these signal plus noise distributions may be "fitted" according to any of a number of methods, the preferred method being the "Normalized Q-scale" fit. This procedure, as described in U.S. Pat. No. 7,899,638 (the entire contents thereof being incorporated herein by reference) preferably uses the sum of the histogram populations from its outer-limits toward 0.5 of the total population to obtain an "Empirical Distribution Function" (EDF), serving as an estimate of the Cumulative Distribution function (CDF). In the preferred embodiment, the result of this procedure is to determine 6 estimates of values representing the character of the distribution: Two "mean values", Two "weights" which are upper-bounded by unity, and two "sigma" values, and two "means" associated with the upper and lower extremes of the distribution. Other sets of characteristic values are possible including results as simple as a single mean value and a single sigma value (the standard deviation of the distribution). Even so, this result can be expressed as a 6-value result, the two means being common (the statistical numerical mean), the two weights being the same (unity) and the two sigma's be the same and equal to the standard deviation of the histogram. So, in any such embodiment, a set of 6 values can be estimated, however degenerate they may be. An additional, $7^{th}$ value can be calculated for each histogram as well, the arithmetic "mean" of each histogram.

FIG. 8 shows one such fit for a noise histogram, in this case using a single weight (assumed the same weight for the right and left extremes of the histogram), two values for sigma (approx. 6 mV) and two vertical lines (the horizontal axis is in 20 mV per div) denoting the effective means for the Gaussians associated with each sigma.

This kind of analysis is preferably performed on every histogram for every category. There are multiple paths of analysis from this point forward:

1) Using the mean value of each histogram a waveshape may be calculated for each UI of a repeating pattern, or for each local history category. Under the assumption that the intervals have been adequately chosen, these mean values can be interpolated to provide a shape across each UI category. Interpolation of this kind is usually "non-linear" and might be for example a windowed-sin(x)/x interpolation algorithm. The shape can be calculated for any number of time points across the UI.

2) The waveshape may be placed on a "warped" (because a clock data recovery (CDR) is used time axis (sometimes called a timebase), by using the expected times for a given acquired waveform, and re-interpolating by numerical means the waveshape onto the sampling times of the original waveform acquisition. As such, the "noiseless" waveform corresponding to the acquired waveform is provided.

3) A "residual" waveform can be calculated by subtracting the noiseless waveform from the original acquired waveform. This waveform consists of everything which is not systematically related to the shape of the transmitted signal. Correlation of this residual signal to candidate crosstalk or interference signals is of the utmost interest and provide a dramatic and novel tool to evaluate any systematic contributions to "noise" from crosstalk or interference sources. Additionally, spectral analysis of this waveform can be leveraged to identify periodic crosstalk sources. It is interesting to note, for instance that a sinusoidal crosstalk aggressor does not manifest as periodic "jitter" in a jitter analysis, since its effect on jitter is masked by the fact that such an aggressor affects positive edge transitions in the opposite fashion that it affects negative transitions. So in the jitter spectrum, such an aggressor "disappears" while in the spectrum of the residual, it does not. In the noise spectrum, a sinusoidal aggressor is quite apparent.

4) Another "residual" waveform is of great interest, the sampled residual. That is the waveform consisting of voltage samples of the residual waveform, at a single specified position within each UI. This waveform is analogous to the existing jitter analysis waveform called "RjBUjTrack". The result is "RnBUnTrack." It is however representative of the deviations from expected location of each bit-sequence category's trajectory at the time usually associated with "decoding" the serial data stream into bit values of zero and one. This represents only the noise at the time a digital receiver would "sample" and make the 1 or 0 state decisions. It's notable that this is the "noise" that affects the channels degradation for a given sampling phase or time within the UI. It is less useful than the previously described residual waveform since it is less easily correlated with suspected crosstalk sources.

In addition to being an "analog" to the RjBUj Track type waveform in jitter analysis, it can also be submitted to the same kind of spectral analysis to determine an overall random noise and deterministic noise, as per that method. What is interesting about this is the spectral nature of crosstalk sources can be revealed.

5) Using the 6-values associated with each category of local history, each histogram can be extrapolated, using floating-point representations of values of the probability density function (PDF) which can be exceedingly small, (e.g. a small as 1e-300 per incremental voltage for simple double-precision IEEE floating point format numbers).

a) The 6 values associated with each interval can be interpolated to allow for a set of 6 values for every coordinate across the UI, and the PDF estimated for each coordinate. The analog of a 2-dimensional PDF (or "fitted" eye diagram) can be calculated and displayed from these PDFs, in much the same way as a classical eye-diagram is displayed. This approach amounts to a "morphing" (Artificially transforming one image to another in a smooth fashion. May be equally applied to two dimensional shapes, such as a histogram or extrapolated PDF) of the fitted histogram from each of the N fitted histograms to the next.

It is this procedural step that permits creating an entire 2-dimensional PDF with great precision and detail from a relatively small number of statistical distributions across all categories of local bit-sequence history.

b) The PDF for each horizontal coordinate can be integrated (or summed) to estimate a CDF, either as a function of variation from the "mean" (Such as CDF, calculated as a difference from the mean value of the signal shall be denoted as a "signal centric" CDF) or as variation from the serial data sampling coordinate. The CDF calculated as a function of deviations from the sampling coordinate, or more importantly the sampling "level" can be called "data-centric".

c) By accumulating either the PDF or CDF results over the horizontal axis for each UI associated with a category, the 2-dimensional probability density or pure probability can be constructed for the entire set of categories, or separately for transition cases and non-transitions cases (as is sometimes required in certain serial data protocols, e.g. PCI express).

d) A smooth representation or display of either of these types of 2-dimensional CDF or contour plots can be produced. Such a plot, specifically the data-centric form, is quite similar in nature to the "StateEye" type of probability plot called a "contour plot".

e) A terraced representation of this information can be produced, whereby the CDF probabilities are truncated, such that all values of probability within a decade (e.g. 1e-10<=p<1e-9) are displayed at a constant intensity or color.

f) An isometric display of constant probabilities can be produced by displaying the borders between the terraced regions. This being a superior and substantially more robust method for obtaining an "IsoBER" graph. It is superior since it shows much more rapid convergence to the expected shapes than analysis of a 2-dimensional "persistence" map, as in existing implementations.

6) In addition to the 2-dimensional displays which can be produced from the results of fitting, two other type of 1-dimensional (Y(t)) functions of time can be produced. Specifically, graphs of the average $Rn(t)$ and $Dn(t)$ can be produced. The first of these is the average sigma for the upper extreme and lower extreme of each histogram or the "Random Noise" (Rn), as determined from the fitting process as a function of the position across a UI. The second is the difference between the means (see Q-scale analysis) or the "deterministic noise" (Dn), also as a function of the position across the UI. These two graphs provide knowledge of whether any crosstalk sources (sometime called "aggressors") are synchronously related in time (but not in bit-sequence) to the serial data channel under observation. They also serve to identify to what degree the noise observed in this bounded and to what extent it is Gaussian.

Through correlation with the derivative of the noiseless waveshape over each category, a further reduction of how much of the "noise" is due to jitter, and how much is purely vertical in nature. (See U.S. Pat. No. 7,516,030, the entire contents thereof being incorporated herein by reference).

7) The analysis of the 2-dimensional CDF, in the central region directly provides the information needed to estimate the overall noise associated with the data channel at a given sampling position or phase within the nominal UI. The Random Noise (Rn), Deterministic Noise (Dn) and Total Noise as a function of Tn(BER) are all easily determined through examination of the profile of a vertical slice (at the specified sampling position) across the CDF eye.

8) The analysis of the 2-dimensional CDF, or contour plot, in the central region directly provides the information needed to estimate the jitter associated with the data channel. The Random Jitter (Rj), Deterministic Jitter (Dj) and Total jitter as a function of Tj (BER) are all easily determined through examination of the profile of a horizontal slice across the CDF eye. It is notable that apart from the transition detection and CDR procedure, no direct analysis of jitter or timing has previously led to this result.

9) As an analog to practice of "noise compensation of jitter" in the industry, the known noise level introduced by the measuring instrumentation may be applied to the procedure above (specifically in the construction of the vertical PDF using the 6 fit parameters) and modifying the two sigma values via quadrature subtraction (square-root of the difference of squares) can be modified to more realistically produce the vertical PDF's in the theoretical absence of the uncorrelated noise contributed by the instrumentation. Under such circumstances, much more is compensated than just the results of the estimates of Rj and Tj (note no effect of Dj is implied). These are indeed affected, however all of the 2 dimensional diagrams described are correctly represented and all subsequent conclusions are automatically adapted (e.g. the bathtub curve, the eye diagrams, the margins, IsoBER Rn, Tn etc. are modified). This is substantially more valuable when comparing measurement instruments and in estimating the true signal integrity.

Some methods already exist for creating contour and isometric displays of this type. The display types may be considered "prior-art", this method to obtain such displays is in this case novel. This is not a "modeled" result, nor is it a result deduced from "Bit Error Detection" instrumentation (e.g. a Bit Error rate Tester (BERT)). The point I'm trying to make, is that while the finished displays attempt to transmit the same kind of information, the means by which the information is obtained is not at all the same. We do not claim as invention this kind of display, but we do claim the method for obtaining it.

There are a number of novel aspects of this method of analysis, which will be described now. Of course, this is to be considered an exemplary list only, and any number of additional aspects of the invention may be considered novel.

Only by performing the statistical analysis on specific portions of the acquired signal in isolation (that is, before the acquired signal is accumulated into the eye-diagram) can the statistical characteristics of the noise be managed without ambiguity.

The categorization of local patterns is conceived such that except in the presence of overwhelming noise, which precludes identifying the bit sequence, the trajectory of the signal through the focal UI is predictable, and the variations from this average trajectory are controlled. The analysis of the variations from the average trajectory is simplified and straightforward, especially when advanced by the normalized Q-scale fitting procedure, to the objective of correctly establishing the bounded and unbounded nature of the distributions, with a minimum of presumptions.

Jitter/Xtalk Displays for Serial Data Analysis and Crosstalk Analysis

Classification of Local UI

There are at least two ways (as previously mentioned) to categorize or classify the sets of histograms used for this analysis. The first is straightforward, assuming the signal(s) under observation are repeating sequences of 1's and 0's. However, it is worth mentioning that a kind of content-addressable memory structure may be required to manage the categories which cannot be entirely anticipated (except in the extreme case where for a local number of bits, M there can be 2 to the power M possible states or "code"s associated with the categories. Either approach is possible. However modern encoding methods employed in the serial data communications industry often substantially reduce the number of possible codes which are possible. The current implementation for this type of categorization uses the notion of std::Map<int, int> to associate a "code" or category to an offset into a linear array of histogram results. Also in the current implementation, the number of intervals which extend into the prior and post unit intervals is about N/2, where N is the number of intervals per UI.

It should also be understood that the invention, while described generally as a set of method steps and resulting images, is equally applicable to a computer program stored to a non-transitory medium which, when run on a general purpose computer and processor, or other specialized hardware, such as an oscilloscope or other test and measurement apparatus, and including one or more of an acquisition channel, clock recovery module, processor, memory communication system and the like to support operation of the computer program. Therefore, the invention is equally applicable to a hardware system including a processor for allowing the system to perform the desired method steps. Furthermore, this system may be positioned locally, remotely, spread over multiple locations, and may include cloud or other remote computing systems and/or storage.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A computer-implemented method, comprising:
    sampling, by an electronic measurement instrument, a signal to identify sampled values of the signal at different times;
    identifying, by the electronic measurement instrument, a sequence of bit states encoded within the signal with unit intervals, by analyzing the sampled values of the signal;
    identifying, by the electronic measurement instrument and through analysis of the sequence of bit states that were identified by analyzing the sampled values, multiple instances of a same bit state that occur in the signal after a same pattern of multiple bit states, wherein the same bit state is either a digital '0' or a digital '1', and the same pattern of multiple bit states is a same pattern of digital '0's and digital '1's;
    identifying, by the electronic measurement instrument, multiple first values at a first position within unit intervals that encode the multiple instances of the same bit state that occur after the same pattern of multiple bit states;
    generating, by the electronic measurement instrument based on analysis of the multiple first values, a first mathematical representation of the multiple first values;
    identifying, by the electronic measurement instrument, multiple second values at a second position within the unit intervals that encode the multiple instances of the same bit state that occur after the same pattern of multiple bit states;
    generating, by the electronic measurement instrument based on analysis of the multiple second values, a second mathematical representation of the multiple second values; and
    displaying, by the electronic measurement instrument, a probability density representation of the unit intervals that encode the multiple instances of the same bit state that occur after the same pattern of multiple bit states, based on:
        (i) the first mathematical representation of the multiple first values at the first position within the unit intervals that encode the multiple instances of the same bit state that occur after the same pattern of multiple bit states, and
        (ii) the second mathematical representation of the multiple second values at the second position within the unit intervals that encode the multiple instances of the same bit state that occur after the same pattern of multiple bit states,
    wherein the probability density representation of the unit intervals that encode the multiple instances of the same bit state that occur after the same pattern of multiple bit states is displayed independent of values that encode any bit state preceded by a different pattern of multiple bit states that is different from the same pattern of multiple bit states, resulting in a probability density representation that is specific to the multiple instances of the same bit state that occur after the same pattern of multiple bit states.

2. The computer-implemented method of claim 1, wherein identifying the multiple instances of the same bit state that occur after the same pattern of multiple bit states includes identifying that the multiple instances of the same bit state are each located at a particular position in a repeating pattern of bit states.

3. The computer-implemented method of claim 1, further comprising identifying the first and second positions within the unit intervals that encode the multiple instances of the same bit state by dividing each of the unit intervals that encode the multiple instances of the same bit state into a number of sub-intervals.

4. The computer-implemented method of claim 1, wherein:
identifying the multiple first values at the first position includes generating a first histogram of values; and
identifying the multiple second values at the second position includes generating a second histogram of values.

5. The computer-implemented method of claim 1, wherein
the first mathematical representation of the multiple first values at the first position within the unit intervals that encode the multiple instances of the particular bit state comprises a first mathematical equation that represents the multiple first values at the first position, and
the second mathematical representation of the multiple second values at the second position within the unit intervals that encode the multiple instances of the particular bit state comprises a second mathematical equation that represents the multiple second values at the second position.

6. The computer-implemented method of claim 1, further comprising:
identifying, by the electronic measurement instrument and through analysis of the sequence of bit states, multiple instances of a second, same bit state that occur in the signal after a second, same pattern of multiple bit states that differs from the same pattern of multiple bit states.

7. The computer-implemented method of claim 1, wherein displaying the probability density representation of the unit intervals that encode the multiple instances of the same bit state that occur after the same pattern of multiple bit states includes presenting an eye diagram of the unit intervals that encode the multiple instances of the same bit state that occur after the same pattern of multiple bit states.

8. The computer-implemented method of claim 1, wherein the electronic test instrument is an oscilloscope.

9. The computer-implemented method of claim 5, further comprising:
generating the first mathematical equation that represents the multiple first values at the first position includes generating a first histogram of the multiple first values and creating the first mathematical equation to represent the first histogram; and
generating the second mathematical equation that represents the multiple second values at the second position includes generating a second histogram of the multiple second values and creating the second mathematical equation to represent the second histogram.

10. An electronic test instrument, comprising:
an input to acquire an electronic waveform;
a processor;
non-transitory medium storing a computer program that, when executed by the processor, causes the electronic test instrument to perform operations that include:
identifying, by the electronic measurement instrument, a sequence of bit states encoded within the signal with unit intervals, by analyzing the sampled values of the signal;
identifying, by the electronic measurement instrument and through analysis of the sequence of bit states that were identified by analyzing the sampled values, multiple instances of a same bit state that occur in the signal after a same pattern of multiple bit states, wherein the same bit state is either a digital '0' or a digital '1', and the same pattern of multiple bit states is a same pattern of digital '0's and digital '1's;
identifying, by the electronic measurement instrument, multiple first values at a first position within unit intervals that encode the multiple instances of the same bit state that occur after the same pattern of multiple bit states;
generating, by the electronic measurement instrument based on analysis of the multiple first values, a first mathematical representation of the multiple first values;
identifying, by the electronic measurement instrument, multiple second values at a second position within the unit intervals that encode the multiple instances of the same bit state that occur after the same pattern of multiple bit states;
generating, by the electronic measurement instrument based on analysis of the multiple second values, a second mathematical representation of the multiple second values; and
displaying, by the electronic measurement instrument, a probability density representation of the unit intervals that encode the multiple instances of the same bit state that occur after the same pattern of multiple bit states, based on:
  (i) the first mathematical representation of the multiple first values at the first position within the unit intervals that encode the multiple instances of the same bit state that occur after the same pattern of multiple bit states, and
  (ii) the second mathematical representation of the multiple second values at the second position within the unit intervals that encode the multiple instances of the same bit state that occur after the same pattern of multiple bit states,
wherein the probability density representation of the unit intervals that encode the multiple instances of the same bit state that occur after the same pattern of multiple bit states is displayed independent of values that encode any bit state preceded by a different pattern of multiple bit states that is different from the same pattern of multiple bit states, resulting in a probability density representation that is specific to the multiple instances of the same bit state that occur after the same pattern of multiple bit states.

11. The electronic test instrument of claim 10, wherein identifying the multiple instances of the same bit state that occur after the same pattern of multiple bit states includes identifying that the multiple instances of the same bit state are each located at a particular position in a repeating pattern of bit states.

12. The electronic test instrument of claim 10, wherein the operations further include identifying the first and second positions within the unit intervals that encode the multiple instances of the same bit state by dividing each of the unit intervals that encode the multiple instances of the same bit state into a number of sub-intervals.

13. The computer-implemented method of claim 10, wherein:
- identifying the multiple first values at the first position includes generating a first histogram of values; and
- identifying the multiple second values at the second position includes generating a second histogram of values.

14. The electronic test instrument of claim 10, wherein
- the first mathematical representation of the multiple first values at the first position within the unit intervals that encode the multiple instances of the particular bit state comprises a first mathematical equation that represents the multiple first values at the first position, and
- the second mathematical representation of the multiple second values at the second position within the unit intervals that encode the multiple instances of the particular bit state comprises a second mathematical equation that represents the multiple second values at the second position.

15. The electronic test instrument of claim 10, wherein the operations further comprise:
- identifying, by the electronic measurement instrument and through analysis of the sequence of bit states, multiple instances of a second, same bit state that occur in the signal after a second, same pattern of multiple bit states that differs from the same pattern of multiple bit states.

16. The electronic test instrument of claim 10, wherein displaying the probability density representation of the unit intervals that encode the multiple instances of the same bit state that occur after the same pattern of multiple bit states includes presenting an eye diagram of the unit intervals that encode the multiple instances of the same bit state that occur after the same pattern of multiple bit states.

17. The electronic test instrument of claim 10, wherein the electronic test instrument is an oscilloscope.

18. The electronic test instrument of claim 14, wherein the operations further include:
- generating the first mathematical equation that represents the multiple first values at the first position includes generating a first histogram of the multiple first values and creating the first mathematical equation to represent the first histogram; and
- generating the second mathematical equation that represents the multiple second values at the second position includes generating a second histogram of the multiple second values and creating the second mathematical equation to represent the second histogram.

* * * * *